Figure 1:
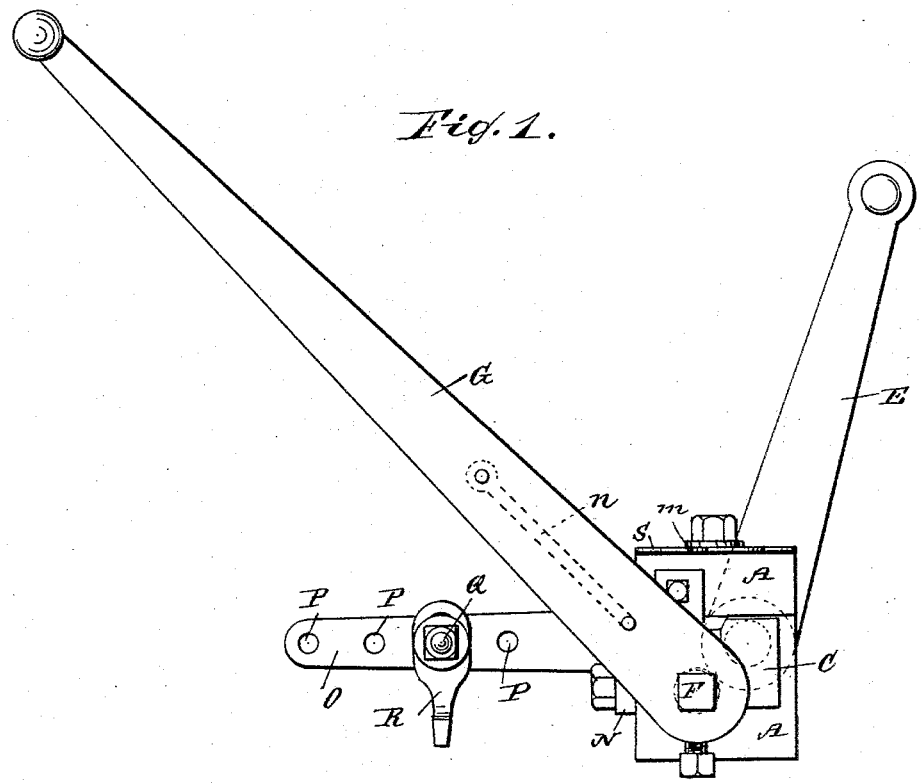

(No Model.)  2 Sheets—Sheet 1.
H. WILLIAMSON.
SAW SWAGING DEVICE.

No. 325,467. Patented Sept. 1, 1885.

WITNESSES:
Theo. G. Hoster
C. Sedgwick

INVENTOR:
H. Williamson
BY Munn & Co.
ATTORNEYS.

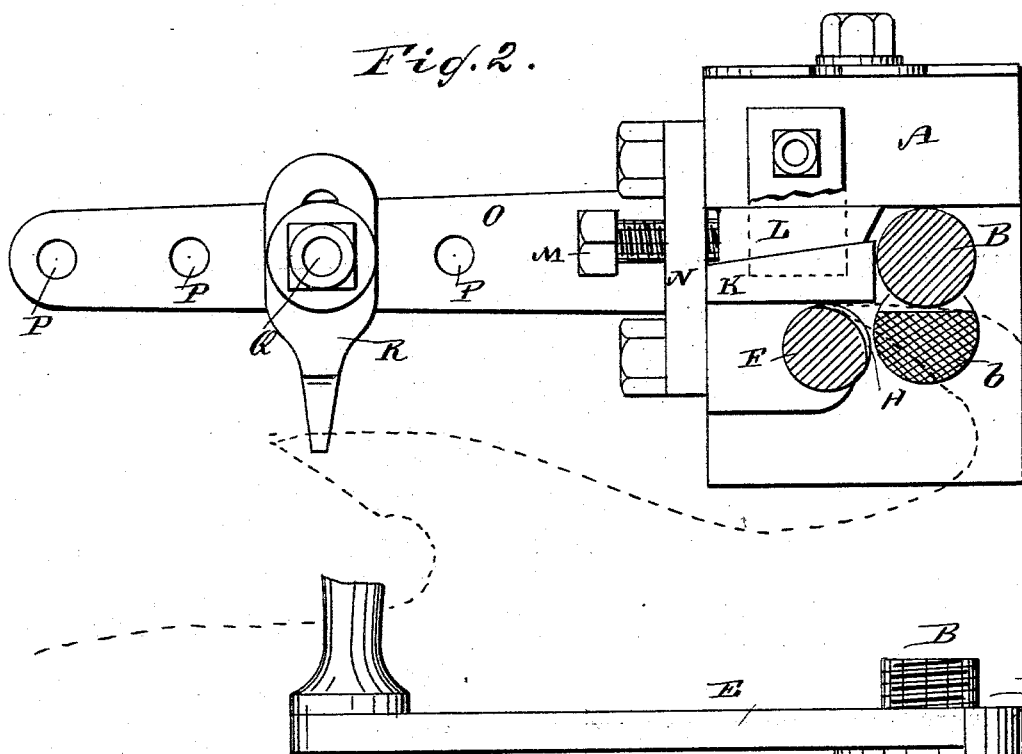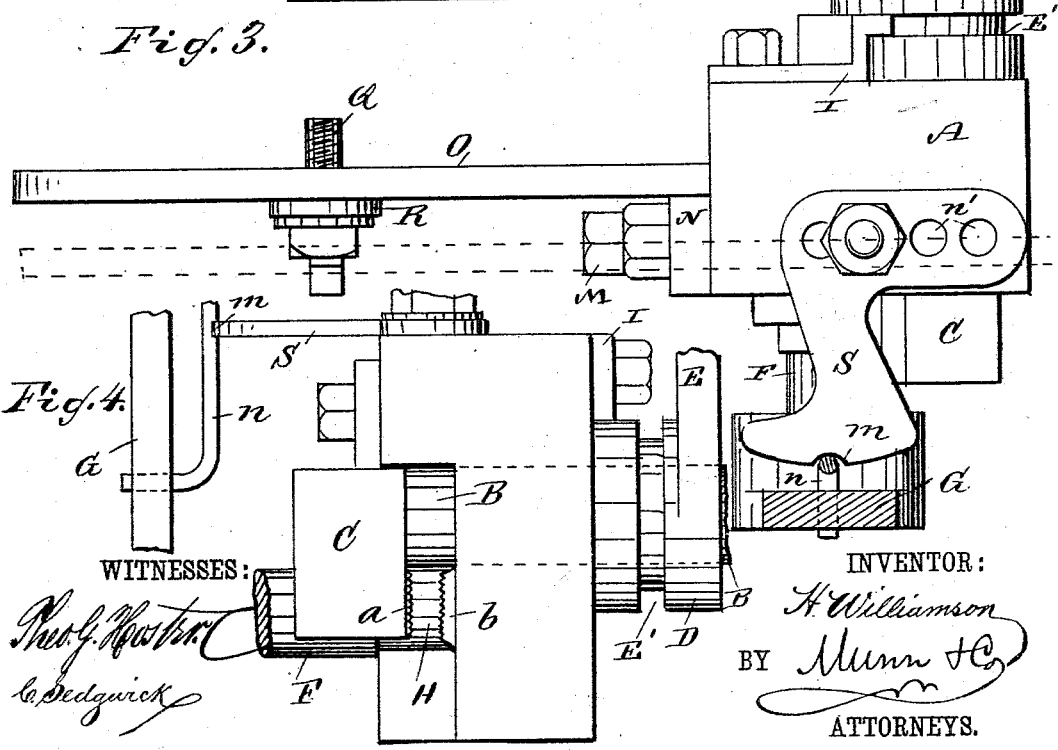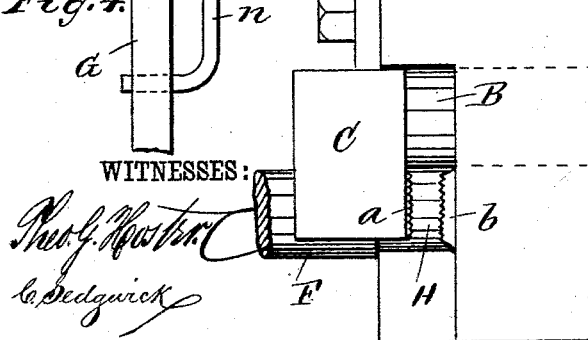

UNITED STATES PATENT OFFICE.

HENRY WILLIAMSON, OF BAY CITY, MICHIGAN.

SAW-SWAGING DEVICE.

SPECIFICATION forming part of Letters Patent No. 325,467, dated September 1, 1885.

Application filed December 4, 1884. (No model.)

*To all whom it may concern:*

Be it known that I, HENRY WILLIAMSON, of Bay City, in the county of Bay and State of Michigan, have invented a new and Improved Saw-Swaging Machine, of which the following is a full, clear, and exact description.

The object of my invention is to provide a new and improved saw-swage which is simple in construction, light, strong, and durable, and which can be used on gang or circular saws.

The invention consists in the combination, with a box, of a device for gripping the saw-teeth, and a shaft on which a die is formed for swaging the teeth.

The invention also consists in parts and details and combinations of the same, as will be fully set forth hereinafter.

Reference is to be had to the accompanying drawings, forming part of this specification, in which similar letters of reference indicate corresponding parts in all the figures.

Figure 1 is a side view of my improved saw-swaging machine. Fig. 2 is a longitudinal sectional view of the same. Fig. 3 is a plan view of the same, a part being broken away. Fig. 4 is a rear view of the same, parts being broken away.

In a box, A, a spindle, B, is arranged to slide transversely, and is provided at one end with a downwardly-projecting jaw, C, and has its opposite end screw-threaded, and on the said screw-threaded end a nut, D, is mounted, provided with a crank-handle, E, and with an annular groove, E', into which a clip, I, on the box projects to permit the nut to revolve, but to prevent its movement toward and from the side of the box.

The jaw C is provided on its inner side with a raised, toothed, or serrated part, $a$, which is opposite a toothed and serrated part, $b$, on the box.

Directly in front of the part $b$ a shaft, F, is journaled transversely in the box, and is provided on one end with a crank-handle, G, which is on the opposite side of the box to the handle E.

On the shaft F a die, H, is formed by cutting a segmental groove in the shaft, the bottom of the groove being made convex transversely.

A wedge-shaped die, K, is held loosely above the shaft F, and on the die K a wedge, L, rests, which can be adjusted by a screw, M, passed through a piece, N, on the box.

An arm, O, projects from the front of the box, and is provided with a series of apertures, P, through one of which a screw, Q, is passed, which is also passed through a support, R, placed against the arm O, and having its lower end forked to adapt it to rest upon the saw-teeth.

An angular arm, S, is held on the top of the box, and is provided in the outer edge of its outer shank with a notch, $m$, for receiving a spring, $n$, on the handle G. The arm S is provided with a series of apertures, $n'$, for adjusting the arms S on the box.

The operation is as follows: The instrument is placed on the saw in such a manner that the wedge K rests upon the tooth to be swaged, and the support R rests upon the next tooth. The tooth to be swaged is then gripped firmly by turning the nut D, whereby the jaw C is pressed against the tooth, which in turn is pressed against the side of the box A. The nut D is turned by means of the handle E, and by means of the clip I is prevented from moving lengthwise on the screw. The support R can be adjusted on the arm O a greater or less distance from the box A, according to the distance the teeth of the saw are spaced. The handle G is then swung either forward or back, and thereby the die H is forced against the bottom of the point of the tooth, the top of which is forced against the bottom of the wedge-shaped die K, and is thus swaged. If the tooth is to be swaged slightly the handle G is swung in the direction from the free end of the arm O, and if the tooth is to be swaged considerably the handle G is swung toward the free end of the arm O.

The handle G is held at rest by engaging the spring $n$ in the notch $m$ of the plate S.

The plate S can be held in different positions on the box A. The die K can be adjusted as may be required by the screw M.

Circular or gang saws can be swaged as much as may be desired by means of the above-described apparatus.

Having thus described my invention, what I claim as new, and desire to secure by Letters Patent, is—

1. In a saw-swage, the combination, with the box A, of a saw-tooth-gripping device, the flat die K, wedge L, and shaft F, provided with a segmental groove forming a die, substantially as herein shown and described.

2. In a saw-swage, the combination, with the box A, of a saw-tooth-gripping device, the flat die K, the wedge L, and the shaft F, on which a die is formed, substantially as herein shown and described.

3. In a saw-swage, the combination, with the box A, of the shaft F, on which a die is formed, the sliding spindle B, having one end screw-threaded, and a jaw, C, secured on the opposite end, and the nut D, held to the box and provided with a handle, substantially as herein shown and described.

4. In a saw-swage, the combination, with the box A, of a shaft provided with a die, the arm O, and the adjustable support R on the same, substantially as herein shown and described.

5. In a saw-swage, the combination, with the box A, of a tooth-gripping device, the shaft F, on which the die H is formed, the handle G, the spring n, and the notched arm S on the box, substantially as herein shown and described.

HENRY WILLIAMSON.

Witnesses:
W. G. BEARD,
W. A. PETTAPIECE.